US008761914B2

(12) United States Patent
Takahashi et al.

(10) Patent No.: US 8,761,914 B2
(45) Date of Patent: Jun. 24, 2014

(54) AUDIO APPARATUS

(75) Inventors: Daisuke Takahashi, Hamamatsu (JP); Hideki Hagiwara, Hamamatsu (JP)

(73) Assignee: Yamaha Corporation (JP)

( * ) Notice: Subject to any disclaimer, the term of this patent is extended or adjusted under 35 U.S.C. 154(b) by 661 days.

(21) Appl. No.: 12/730,220

(22) Filed: Mar. 23, 2010

(65) Prior Publication Data

US 2010/0241257 A1 Sep. 23, 2010

(30) Foreign Application Priority Data

Mar. 23, 2009 (JP) .................................. 2009-70265

(51) Int. Cl.
*H04B 1/00* (2006.01)
*H04B 1/20* (2006.01)
*H04S 1/00* (2006.01)

(52) U.S. Cl.
CPC ..................................... *H04S 1/007* (2013.01)
USPC ................................. 700/94; 381/119; 369/4

(58) Field of Classification Search
USPC ............................ 700/94; 381/119; 369/1-12
See application file for complete search history.

(56) References Cited

U.S. PATENT DOCUMENTS 7,139,625 B2 11/2006 Aiso et al.
2003/0233158 A1 12/2003 Aiso et al.
2005/0185805 A1 8/2005 Aiso et al.
2005/0192688 A1 9/2005 Takemura
2006/0005130 A1 * 1/2006 Hiroi et al. .................... 715/700

FOREIGN PATENT DOCUMENTS

JP 2004-056332 A 2/2004
JP 2004072716 A 3/2004
JP 2005-244764 A 9/2005
JP 2005236792 A 9/2005
JP 4001121 B2 10/2007

OTHER PUBLICATIONS

Office Action issued in Japanese Patent Application 2009-070265 dated Dec. 18, 2012.

* cited by examiner

*Primary Examiner* — Andrew C Flanders
(74) *Attorney, Agent, or Firm* — Rossi, Kimms & McDowell, LLP

(57) ABSTRACT

In a RAM 1-3, a data area and a current memory are provided. A signal processing portion 1-10 processes audio signals in accordance with a parameter set stored in the current memory. In the data area, a plurality of S data sets each formed of a parameter set and an S list which is a list of S data sets are stored. Each S data set is identified by its unique identification information (SID). The S list stores list information including SIDs which identify the respective S data sets. When storage of the parameter set stored in the current memory is desired, a new SID is generated, so that list information including the generated SID is added to the S list, with the SID being added to the parameter set of the current memory to be stored as a new S data set in the data area.

5 Claims, 11 Drawing Sheets processing algorithm of signal processing portion and waveform I/O

S list (snapshot list)

S data (snapshot data)

E list (event list)

current memory

AUDIO APPARATUS

BACKGROUND OF THE INVENTION

1. Field of the Invention

The present invention relates to an audio apparatus having a processing portion which processes audio signals in accordance with a parameter set.

2. Description of the Related Art

As an audio apparatus having a processing portion which processes audio signals, conventionally, a digital mixer for use in a concert hall and the like has been known such as Japanese Unexamined Patent Publication No. 2004-56332 and Japanese Patent Publication No. 4001121, which adjusts the level and frequency response of audio signals output from a multiplicity of microphones, an electric/electronic musical instrument and the like to mix the adjusted audio signals to send the mixed audio signals to a power amplifier. A manipulator of the digital mixer controls the tone volume and the tone color of respective audio signals indicative of musical tones of musical instruments and vocals by manipulating various kinds of panel controls of the digital mixer in order to realize optimal musical performance. By the manipulator's control, respective parameter values of a parameter set for audio signal processing are optimally adjusted. The digital mixer has a plurality of input channels serving as channels for inputting signals, buses for mixing signals output from the input channels, and output channels serving as channels for outputting the mixed signals. The respective input channels control the frequency response, the mixing level and the like of the input signals and then output the controlled signals to the mixing buses, respectively, whereas the respective mixing buses mix the input signals and then output the mixed signal to corresponding output channels. The outputs from the output channels are amplified to be emitted as tones from speakers and the like.

The conventional digital mixer stores, in a current memory, a parameter set formed of parameters for signal processing provided for respective channels, the parameters being set by use of controls such as faders, knobs, buttons, switches, mouse and joysticks provided on a panel. The parameter set stored in the current memory can be stored as a scene in a scene memory. Each scene is given a scene number to be stored, so that the manipulator can designate a scene number in order to recall a corresponding scene. In response to the manipulator's recall manipulation, the scene having the designated scene number is read out, so that the digital mixer can reproduce settings defined by the scene. Therefore, the conventional digital mixer is able to reproduce various kinds of scenes such as conference rooms, banquet halls, mini theaters and multi-purpose halls which the manipulator has once set. The number of scenes which can be stored in a scene memory provided with areas for storing a plurality of scenes varies according to the type of digital mixer. For example, the number of scenes which can be stored in a scene memory is 100. In this example, when the manipulator desires to store scenes in the scene memory, the manipulator is to designate unused scene numbers selected from among scene numbers 1 to 100 before storing the scenes in the scene memory. Consequently, the scenes are stored in the areas of the designated scene numbers, respectively, so that the scenes stored in the scene memory can be identified by their scene numbers, respectively. When the manipulator desires to recall a scene from the scene memory, the manipulator designates the scene which he desires to recall by identifying the scene number of the scene. As a result, the scene which the manipulator desires to recall is read out from the scene memory, so that a parameter set of the read scene is provided for the current memory. In addition, the conventional digital mixer has an event list function. An event list provided by the event list function stores a plurality of event sets each having an event indicating, by a scene number, a scene recalled when a trigger condition is satisfied and an event number indicative of the order in which the event is executed. By the event list function, scenes recalled on the basis of the event list are sequentially set on the digital mixer.

SUMMARY OF THE INVENTION

To the conventional digital mixer, a personal computer (hereafter referred to as a "PC") can be connected to allow a user to control the digital mixer from the PC. In this case, by installing, on the PC, a mixer control application which allows the PC to edit scenes off-line, the user is able to edit the scenes on the PC off-line by use of the mixer control application without connecting the PC to the digital mixer. The user is also able to store the edited scenes in a scene memory of the PC. In order to store the scenes, the user designates unused scene numbers to store the scenes in areas of the designated scene numbers. Then, the user connects the PC to the digital mixer to write the scenes stored in the scene memory of the PC into the scene memory of the digital mixer. By such procedures, the scenes edited on the PC are provided for the digital mixer.

On the digital mixer, furthermore, the user is able to select an event list from among a plurality of event lists to read the selected event list. The selected event list is read into a working memory. In a case where all scenes which are to be recalled by the newly read event list are not read into the working memory, it is necessary to additionally read the scenes which have not been read yet into the working memory. However, because the scene numbers given to the scenes for identification of the scenes are selected from unused numbers at the time of storage of the scenes, there is a possibility of overlaps between the scene numbers of scenes which already exist in the working memory and the scene numbers of the additionally read scenes. On the additional reading of the scenes into the working memory, disadvantageously, the overlaps of the scene numbers could cause overwriting of the existing scenes stored in the working memory with the additionally read scenes, resulting in unexpected deletion of the existing scenes stored in the working memory. On the conventional digital mixer, therefore, in order to avoid such unexpected deletion of the already read scenes, the user refrains from additional reading of scenes created on other apparatuses into the digital mixer.

On some event lists, furthermore, scenes which are to be recalled are quite large in number. In order to efficiently create such a large number of scenes, the workload of creating the necessary scenes could be shared by some people. Disadvantageously, however, because additional reading of scenes created on other apparatuses into the conventional digital mixer is avoided, the workload of creating such a large number of scenes cannot be shared by some people. If the scenes created separately by some people on a different digital mixer and a PC were added one after another to be stored in the conventional digital mixer, there would be a possibility of overlaps of scene numbers among the scenes. In a case of an overlap of scene number, such additional reading of a scene having an overlapping scene number could cause overwriting of a necessary scene with the additionally read scene, ending up unexpected deletion of the necessary scene. As described above, the conventional digital mixer is disadvantageous in that the workload of creating a plurality of scenes that are to be recalled by an event list cannot be shared by some people.

The present invention was accomplished to solve the above-described problem, and an object thereof is to provide an audio apparatus which enables, even though the audio apparatus has already read a plurality of setting data sets each formed of a parameter set, additional reading of different setting data sets into the audio apparatus without overwriting of any of the already read setting data sets.

In order to achieve the above-described object, the present invention provides an audio apparatus comprising a current memory for storing a parameter set formed of a plurality of parameters; a change portion for changing a value of a parameter of the parameter set stored in the current memory in accordance with a request for change; an audio signal processing portion for processing an input audio signal in accordance with the parameter set stored in the current memory and outputting the processed audio signal; a setting data memory for storing a plurality of setting data sets each having the same configuration as that of the parameter set and being identified by a unique ID given to the setting data set; a list memory for storing the plurality of IDs which identify the setting data sets stored in the setting data memory in a manner in which the IDs are correlated with data numbers, respectively; a storage portion for responding to a request for storage with a data number being specified, the storage portion creating, in a case where an ID correlated with the specified data number is not stored in the list memory, a unique ID and storing the parameter set stored in the current memory in the setting data memory as a setting data set which is to be identified by the created unique ID as well as storing the created unique ID in the list memory in a manner in which the ID is correlated with the specified data number; the storage portion overwriting, in a case where an ID correlated with the specified data number is stored in the list memory, the setting data set stored in the setting data memory and identified by the ID with the parameter set stored in the current memory; and a call portion for responding to a call request with a data number being specified, the call portion reading, in a case where an ID correlated with the specified data number is stored in the list memory, a setting data set identified by the ID from the setting data memory and overwriting the parameter set stored in the current memory with the read setting data set.

According to the present invention, the identification of setting data sets by the unique identification information enables additional reading of setting data sets in addition to existing setting data sets, without overwriting of the existing setting data sets. Therefore, the present invention allows some people to share the workload of creating setting data sets which are to be recalled by an event list, for the identification of the setting data sets, which are separately created by the some people, by the unique identification information enables integration of the separately created setting data sets without overwriting any setting data sets. Consequently, the present invention allows some people to share the workload of creating setting data sets which are to be recalled by an event list.

DESCRIPTION OF THE PREFERRED EMBODIMENT

Figure 1:
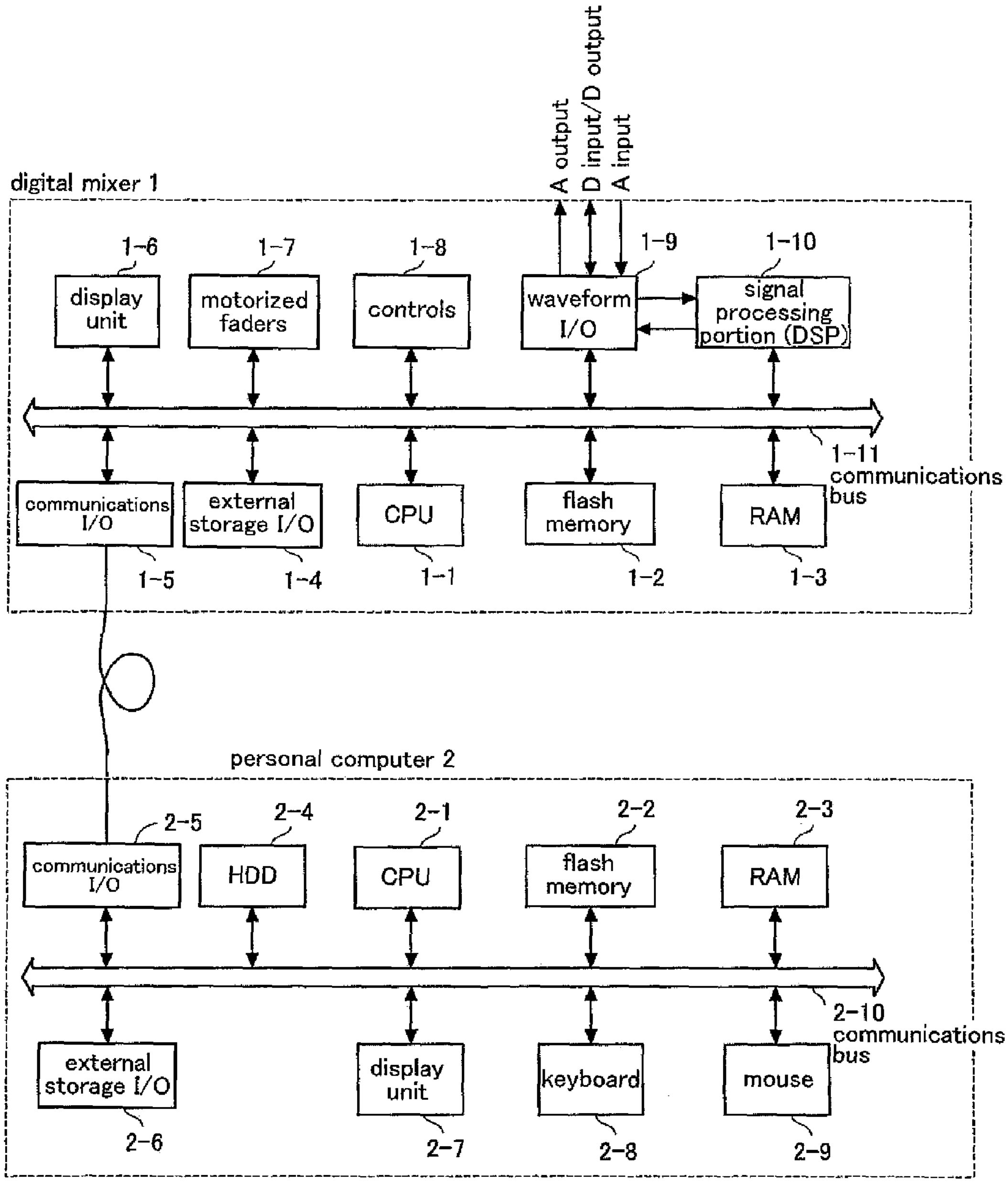
FIG. 1 is a block diagram indicating the configuration in which a personal computer is connected to a digital mixer which is an embodiment of the audio apparatus of the present invention.

FIG. 1 is a block diagram indicating the configuration of a digital mixer 1 which is an embodiment of the audio apparatus of the present invention and the configuration of a personal computer (PC) 2 connected to the digital mixer 1.

The digital mixer 1 according to the embodiment of the present invention indicated in FIG. 1 includes a CPU (Central Processing Unit) 1-1 which controls the entire operation of the digital mixer 1 and generates operational signals in accordance with user's manipulations of controls such as switches, knobs, faders, buttons, mouse and joysticks, a rewritable non-volatile flash memory 1-2 which stores operational software such as a mixing control program executed by the CPU 1-1, and a RAM (Random Access Memory) 1-3 which functions as a working area for the CPU 1-1 and stores various kinds of data. Because the operational software is stored in the flash memory 1-2, the digital mixer 1 allows updates of the operational software by rewriting the operational software stored in the flash memory 1-2. Furthermore, external storage media such as USB memory and SD memory are connected to the digital mixer 1 via an external storage I/O 1-4 which is an input/output interface to store data stored in the working area of the RAM 1-3 and the like in the external storage media. To a communications I/O 1-5 which is a communications interface, in addition, a PC 2 is connected via a communications line.

A display unit 1-6, which is provided on a panel of the digital mixer 1, is a touch screen having a display such as liquid crystal display and matrix switches and the like. A user' manipulation of depressing an control icon displayed on the display unit 1-6 results in a change in a parameter value or switching between on and off. Motorized faders 1-7, which are faders for controlling the level of audio signals of input channels or output channels, are operated manually or motor-operated. Controls 1-8 include controls such as switches and knobs for changing parameters of a selected channel and the like, and controls such as faders provided on channel strips of the panel. Every input and every output on the digital mixer 1 is made via a waveform I/O (waveform data interface) 1-9. The waveform I/O 1-9 has a plurality of A input ports to which analog signals are input, a plurality of A output ports to which analog signals are output and a plurality of D input/D output ports to which digital signals are externally input/output bidirectionally.

A signal processing portion (DSP) 1-10, which includes a multiplicity of DSPs (Digital Signal Processors), carries out mixing processing and effect processing under the control of the CPU 1-1. The RAM 1-3 is provided with a current memory in its working area to store respective current values of various parameters for controlling the mixing processing and effect processing. In accordance with a user's manipulation of the controls such as switches and knobs, the CPU 1-1 changes a current value of a parameter stored in the current memory, and controls, in accordance with the current value of the parameter, coefficients and algorithms used for the mixing processing and the effect processing performed by the signal processing portion 1-10. Mixing signals mixed by the signal processing portion 1-10 can be supplied to a recorder to be stored in the recorder. In addition, mixing signals reproduced by the recorder can be supplied to the signal processing portion 1-10. The respective parts are connected to a communications bus 1-11.

The PC 2 indicated in FIG. 1 includes a CPU (Central Processing Unit) 2-1 which controls the entire operation of the PC 2, a rewritable nonvolatile flash memory 2-2 which stores operational software executed by the CPU 2-1 and various kinds of data, and a RAM 2-3 which functions as a working area for the CPU 2-1 and stores various kinds of data. A hard disk of a hard disk drive (HDD) 2-4 stores an operating system (OS) and application programs such as a mixer control program. To a communications I/O 2-5 which is a communications interface, the digital mixer 1 is connected via the communications line. Furthermore, removable external storage media such as USB memory and SD memory are connected to the PC 2 via an external storage I/O 2-6 which is an input/output interface to store data stored in the working area of the RAM 2-3 and the like in the external storage media. A display unit 2-7 displays a screen in accordance with a started application to allow user's manipulations on the screen or various kinds of inputs by use of a keyboard 2-8 and a mouse 2-9. The respective parts are connected to a communications bus 2-10. By connecting the PC 2 to the digital mixer 1 and executing the mixing control program, the user is allowed to remote-control the digital mixer 1 from the PC 2.

Figure 2:
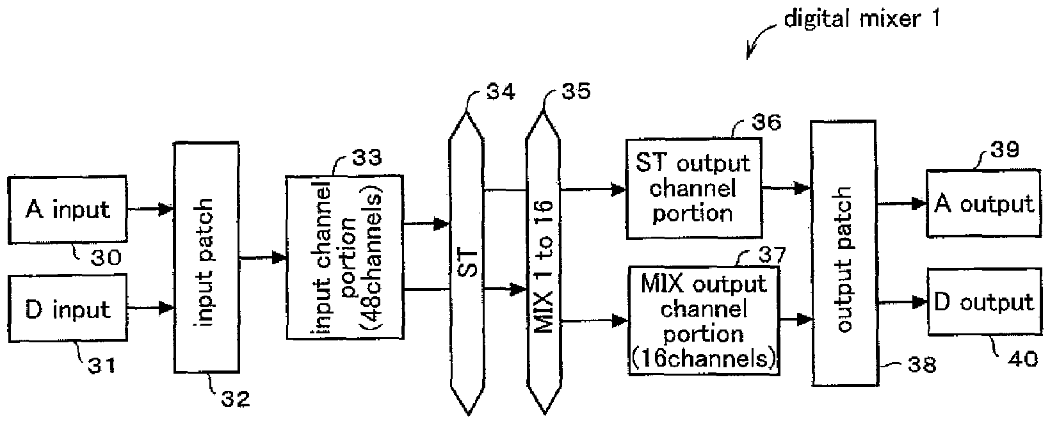
FIG. 2 is an equivalent functional block diagram indicating a processing algorithm of a signal processing portion and a waveform I/O of the digital mixer.

FIG. 2 is an equivalent functional block diagram indicating the processing algorithm of the signal processing portion 1-10 and the waveform I/O 1-9 of the digital mixer 1 indicated in FIG. 1 according to the present invention.

In FIG. 2, analog signals input to a plurality of analog input ports (A input) 30 are converted into digital signals by an AD converter incorporated in the waveform I/O 1-9 to be input to an input patch 32. Digital signals input to a plurality of digital input ports (D input) 31 are input to the input patch 32 directly. The input patch 32 is allowed to selectively patch (connect) one of the input ports from which the signals are input to input channels of an input channel portion 33 having 48 channels, for example. To the respective input channels, signals transmitted from the respective input ports patched by the input patch 32 are supplied.

Each input channel of the input channel portion 33 is provided with an attenuator, an equalizer, a compressor, a gate, a fader, and a send control portion for controlling the send level to a stereo (ST) bus 34 and mixing (MIX) buses 35. In the respective input channels, the frequency balance, the level control and the send level to the ST bus 34 and the MIX buses 35 are controlled. The MIX buses 35 have 16 buses (MIX 1 through MIX 16), for example. The digital signals of the 48 channels output from the input channel portion 33 are selectively output to the ST bus 34 and one or more of the MIX buses 35. In the ST bus 34, one or more digital signals selectively input from any of the 48 input channels are mixed, so that the mixed outputs of the stereo channel are output to an ST output channel portion 36. In each of the 16 MIX buses 35, one or more digital signals selectively input from any of the 48 input channels are mixed, so that the mixed outputs of the 16 channels are output to a MIX output channel portion 37. As a result, the digital mixer 1 is able to obtain the stereo output and the 16 different mixed outputs of the 16 channels.

Each output channel of the ST output channel portion 36 and the MIX output channel portion 37 is provided with an attenuator, an equalizer, a compressor, and a fader. In the respective output channels, the frequency balance, the level control and the send level to an output patch 38 are controlled. The output patch 38 is allowed to selectively patch (connect) a channel of the ST output channel portion 36 and the MIX output channel portion 37 from which the signals are input to output ports of an analog output port portion (A output) 39 and a digital output port portion (D output) 40. To the respective output ports, signals transmitted from the output channels patched by the output patch 38 are supplied.

Digital output signals supplied to the analog output port portion (A output) 39 having a plurality of analog output ports are converted into analog output signals by a DA converter incorporated in the waveform I/O 1-9 to be output from the analog output ports. The analog output signals output from the analog output port portion (A output) 39 are amplified to be emitted from main speakers. In addition, the analog output signals are also supplied to in-ear monitors worn by performers in their ears or reproduced by stage-monitoring speakers placed near the performers. The digital audio signals output from the digital output port portion (D output) 40 having a plurality of digital output ports are supplied to a recorder, an externally connected DAT, and the like to allow digital recording.

The signal processing portion 1-10 of the digital mixer 1 processes signals in accordance with parameter sets formed of signal processing parameters provided for the input channels and output channels by use of the controls 1-8 such as the faders, knobs and switches provided on the panel. In order to emit audio outputs supplied from the digital mixer 1 as tones, more specifically, audio settings are to be provided in accordance with the parameter sets. In the present invention, the audio settings which are to be provided are referred to as snapshots whereas the parameter sets which realize the snapshots are referred to as S data (snapshot data). The snapshots are equivalent to scenes of conventional digital mixers. The S data is also used as setting data for signal processing done by the digital mixer 1. By identifying a snapshot and recalling the snapshot, S data of the identified snapshot is read out to allow the digital mixer 1 to reproduce the audio settings specified by the S data. Consequently, the digital mixer 1 is able to reproduce various snapshots that the user has once set such as conference rooms, banquet halls, mini theaters and multi-purpose halls.

Figure 3:
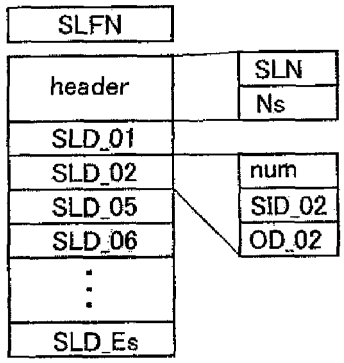
FIG. 3 is a data structure of an S list stored in a working area of the digital mixer.

As data areas for storing data on snapshots, the working area of the RAM 1-3 has an S list area for storing data on an S list (snapshot list) and an S data area for storing S data sets (snapshot data sets) which are substantial data of all snapshots listed in the S list. In addition, the working area of the RAM 1-3 may also have an E list area for storing data on an E list (event list). FIG. 3 indicates the data structure of the S list which lists a plurality of snapshots. As indicated in FIG. 3, the S list, which is provided with a filename (SLFN) of the S list, is formed of a header and a plurality of list data sets (SLDs) each storing information on a snapshot. The header stores information on the name of the S list (SLN) and the last number (Ns) of the SLDs which can be listed in the S list. Each SLD listed in the S list has an SLD number (num), an SID (snapshot ID) which is unique identification information (ID) for identifying the snapshot, and other data (OD). For example, the number (num) of the list data for SLD_02 is "2", whereas its unique SID is SID_02, with the other data OD being OD_02. In the shown example, the S list has a plurality of list data sets, SLD_01, SLD_02, SLD_05, SLD_06, . . . , SLD_Es. In order to add an SLD to the S list, the user designates an unused number. Alternatively, a number is automatically provided to add the SLD to the S list. This embodiment defines the relationship between Ns and Es as Ns≥Es, also defining OD as additional data.

Figure 4:
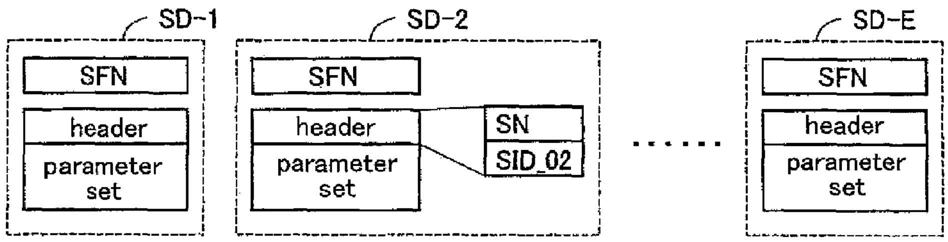
FIG. 4 is a data structure of S data stored in the working area of the digital mixer.

As indicated in FIG. 4, the plurality of S data sets SD-1, SD-2, . . . , SD-E are stored in the S data area. FIG. 4 indicates the data structure of the S data set. Each S data set is formed of a freely given filename (SFN) of the S data, a header and a parameter set. The header stores information on the name of a snapshot (SN) and an SID. The parameter set is setting data for signal processing done by the digital mixer 1. The S data is substantial data of the snapshot. All the S data sets identified by the STDs stored in the respective SLDs listed in the S list are stored in the S data area. In this case, because each SLD stores information on one snapshot, the S data area stores the same number of S data sets as the SLDs. The respective S data sets can be identified by the SID stored in the respective headers of the S data sets. By designating an SID to recall a snapshot, more specifically, the S data set having the designated SID is read out, so that the parameter set of the read S data is provided for the current memory. As a result, the digital mixer 1 is allowed to reproduce the snapshot corresponding to the parameter set. Each time a snapshot is created, a unique SID is given to the snapshot, by a known method, by using an apparatus ID of an apparatus with which a parameter set of the snapshot has been generated, a MAC address, date of generation, a username, random numbers and the like.

Furthermore, the digital mixer 1 of the present invention has an event list function. The E list area of the working area stores an E list which is an event list storing sets each having an event indicating a snapshot identified by the SID of the snapshot which is to be recalled when a trigger condition is satisfied and an event number indicative of the order in which the event is carried out. In accordance with the E list, parameter sets of snapshots recalled with the passage of time are sequentially set on the digital mixer 1, so that the recalled snapshots are sequentially reproduced.

Figure 5:
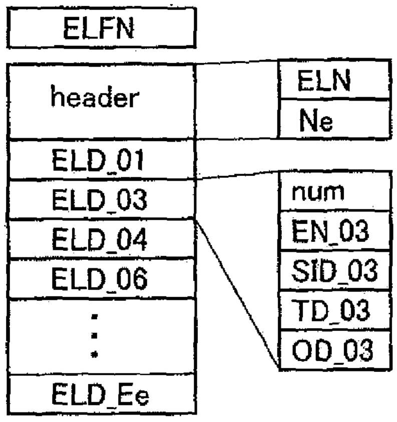
FIG. 5 is a data structure of an E list stored in the working area of the digital mixer.

FIG. 5 indicates the data structure of the E list. As indicated in FIG. 5, the E list, which is given a filename (ELFN) thereof, is formed of a header and list data sets (ELDs) on events. The header stores information on the name of the E list (ELN) and the last number (Ne) of ELDs which can be listed in the E list. Each ELD listed in the E list includes a number (num) of the ELD, an event name (EN), an SID for identifying S data recalled by the event, trigger data (TD) for controlling execution timing and the like of the recalled event, and other data (OD). For example, the number (num) provided for ELD_03 of the event list is "3". The event name, EN is EN_03. The SID used for recall is SID_03. The trigger data, TD is TD_03. The other data, OD is OD_03. In a case where the TD_03 is time information, when the time reaches TD_03, the S data identified by the SID_03 is recalled, so that the parameter set of the S data is provided for the current memory to reproduce the recalled snapshot. In the shown example, the E list has ELDs of ELD_01, ELD_03, ELD_04, ELD_06, . . . , ELD_Ee. In order to add an ELD to the E list, the user designates an unused number. Alternatively, a number is automatically provided to add the ELD to the E list. This embodiment defines the relationship between Ne and Ee as Ne≥Ee, also defining OD as control data. The E list is designed to correspond to the S list stored in the S data area. More specifically, all the S data sets which can be identified by the SIDs included in the events of the E list are stored in the S data area.

Figure 6:
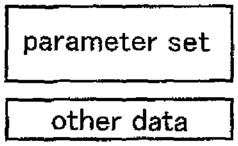
FIG. 6 is a data structure of a current memory provided in the working area of the digital mixer.

Furthermore, a working memory provided in the RAM 1-3 has a current memory area. FIG. 6 indicates the data structure of the current memory. As indicated in FIG. 6, the current memory stores a parameter set and other data in use currently set on the digital mixer 1.

Figure 7:
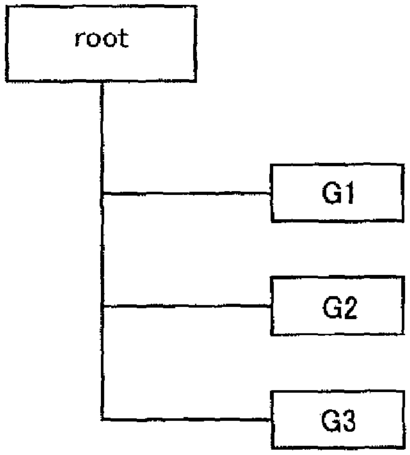
FIG. 7 is a directory structure of a snapshot pool stored in an external storage medium.

Data identical to the S list, E list and plurality of S data sets which are the data on the snapshots stored in the RAM 1-3 are also stored in a storage area of a storage medium accessible by the digital mixer 1. In this case, the identical data may be stored in a storage medium such as Compact Flash, SD Card, USB memory and optical disk or in a storage medium of a networked PC, file server, PDA, web server or the like. An example directory structure of a snapshot pool created in such a storage medium is indicated in FIG. 7. In the example indicated in FIG. 7, the lower hierarchy of a root is provided with three group folders, G1, G2, G3, for example, as folders for storing data on the snapshot. Each of the group folders G1, G2, G3, which is a snapshot file, stores an E list file (ELF), an S list file (SLF) and a plurality of snapshot files (SFs) which are files storing S data. In this case, either SLF or ELF may be stored. Each group folder stores SFs of all the S data sets identified by the SIDs stored in the SLDs of the S list or by the SIDs stored in the ELDs of the E list.

In the directory structure indicated in FIG. 7, when a snapshot stored in the folder G2 is designated to be added to the folder G1, for example, a new SLD having the SID which identifies the snapshot is added to the S list of the folder G1. However, the SF of the S data set which is the substantial data of the added snapshot will not be added to the folder G1. In order to read out the S data set, the SF stored in the folder G2 is referred to so that the S data set can be read out. In a case where the S list of the folder G1 is stored in the storage medium, the S list file and files of all the S data sets listed in the S list including the snapshot which has been added from the folder G2 are stored in the storage medium. Furthermore, when the S list stored in the RAM 1-3 has been updated, for example, an S list of an SLF which is stored in the storage medium and corresponds to the updated S list is also updated. Furthermore, when a new S data set is stored in the S data area of the RAM 1-3, the SF of the new S data set is stored in the storage medium as well. As described above, when data stored in the S list area (E list area) or the S data area of the RAM 1-3 is updated, corresponding data stored in the storage medium is also updated to synchronize data between the RAM 1-3 and the storage medium, so that both the RAM 1-3 and the storage medium can store the same data.

On the digital mixer 1 according to the present invention, by user's manipulation of the control 1-8 such as the knob control and fader, a parameter of a channel to which the manipulated control 1-8 is assigned is changed. The changed parameter is regarded as an applicable parameter of those stored in the current memory, so that the parameter set stored in the current memory is updated. When the user finishes the control of the parameter, and demands to store the parameter set stored in the current memory as a new snapshot, a unique ID is generated as an SID for identifying the new snapshot, so that a new SLD having the SID is listed in the S list. Concurrently, an S data set formed of the parameter set stored in the current memory and the generated SID is stored in the S data area. As explained above, when the user edits/generates a snapshot and stores it in the digital mixer 1, the snapshot is listed in the S list, with the S data of the snapshot being stored in the S data area.

On the digital mixer 1, furthermore, when the user demands to additionally read an SLF stored in the storage medium, the S list of the SLF is temporarily read into the S list area of the RAM 1-3. Of the S data identified by the SIDs stored in the respective SLDs of the additionally read S list, only S data which has not been read into the S data area is additionally read into the S data area. In this case, the SF of the additionally read S data as well as the SLF has been stored in the storage medium. Because every SID is unique, the additional reading of the S data does not involve overwriting of already-existing S data but results in an addition of the S data, for any SIDs are not shared by S data sets. In a case where the additionally read S list has an SLD which is not included in the already-existing S list, a new SLD having the SID and OD of the SLD of the additionally read S list is added to the existing S list. After such processing, the temporarily read S list is deleted from the S list area. As explained above, the digital mixer 1 according to the present invention is able to add a snapshot generated in a different apparatus by additionally reading an S list of an SLF which stores the snapshot.

On the PC 2, furthermore, the user is allowed to designate one of the snapshots stored in the RAM 1-3 of the digital mixer 1 or in the storage medium through the communications I/O 2-5 and the communications I/O 1-5 connected by the communications line to read the designated snapshot into the PC 2 to edit the snapshot. The designation of the snapshot is done by designating a user's desired SLD included in the S list or a user's desired ELD included in the E list. The parameter set of the S data identified by the SID stored in the designated SLD or ELD is read into the current memory of the RAM 2-3 of the PC 2. The designation of the snapshot can be also done by directly designating a user's desired S data set. In this case as well, the parameter set of the designated S data set is read into the current memory of the PC 2. For editing of the snapshot, the user changes parameters of the parameter set stored in the current memory by using the mixer control application.

Once the user has installed the mixer control application capable of off-line editing of snapshots on the PC 2, the user is able to edit/generate a snapshot off-line without connecting the PC 2 to the digital mixer 1 by changing the parameters that configure the snapshot by use of the mixer control application. When the edited parameter set of the current memory is stored in the S data area of the RAM 2-3 of the PC 2 as S data of a new snapshot, the SF of this S data is stored in a storage medium such as a USB memory or the HDD 2-4. In this case, a unique ID is generated as an SID for identifying the new snapshot, so that the S data formed of the SID and the parameter set is to be stored. Concurrently, a new SLD having the generated SID is to be added to the S list.

The S list to which the SLD has been added is also stored in the storage medium. By connecting the PC 2 to the digital mixer 1 or attaching the storage medium to the external storage I/O 1-4 of the digital mixer 1 afterward, the data on the snapshot such as the S list and the S data edited on the PC 2 is written into the digital mixer 1. As a result, the snapshot edited/generated on the PC 2 can be realized on the digital mixer 1.

Figure 8:
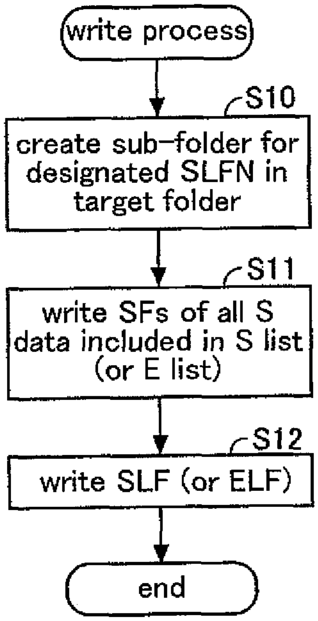
FIG. 8 is a flowchart of a snapshot list write process executed on the digital mixer.

FIG. 8 indicates a flowchart of a write process executed when the user designates a list name SLN (or ELN) of an S list (or E list) and demands writing of the S list (or E list). Data contained in the list is to be written into the storage medium.

When the user designates a list name and demands to write the list, the write process is started. In step S10, a sub-folder for a designated filename is created in a target folder of the storage medium in which the S list (or E list) of the designated list name is to be stored. As the target folder, the user is allowed to select an existing folder or a newly created folder provided in the storage medium to write the list. Into the created sub-folder, in step S11, all the S data sets identified by the SIDs stored in the S list (or E list) having the designated list name are written as SFs. In addition, the designated S list (or E list) is written into the sub-folder as an SLF (or ELF) to terminate the write process. By this write process, as described above, the SLF (or ELF) and the SFs of all the S data sets identified by the SIDs stored in the SLDs of the S list (or ELDs of the E list) of this file are written into the sub-folder of the storage medium. In a case where the storage medium is a removable memory such as a USB memory, the user is able to transfer snapshots created/edited on the PC 2 or a digital mixer to reproduce the snapshots on another digital mixer by removing the storage medium and attaching the storage medium to the another digital mixer.

Figure 9:
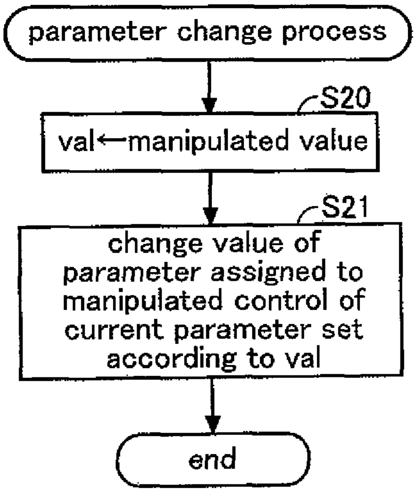
FIG. 9 is a flowchart of a parameter change process executed on the digital mixer.

FIG. 9 indicates a flowchart of a parameter change process executed when the user manipulates the motorized fader 1-7 or the control 1-8 such as a knob capable of changing a parameter provided on the panel of the digital mixer 1.

When the control capable of changing a parameter is manipulated, the parameter change process is started. In step S20, a manipulated value changed by use of the control is stored as a manipulated value "val" in a register. In step S21, a value of a parameter which is included in a parameter set in use stored in the current memory and is assigned to the manipulated control 1-8 is changed according to the manipulated value "val". After step S21, the parameter change process terminates. Although the parameter set whose parameter value has been changed is allowed to be stored as an S data set which realizes a new snapshot, a flowchart of such processing will be described later.

Figure 10:
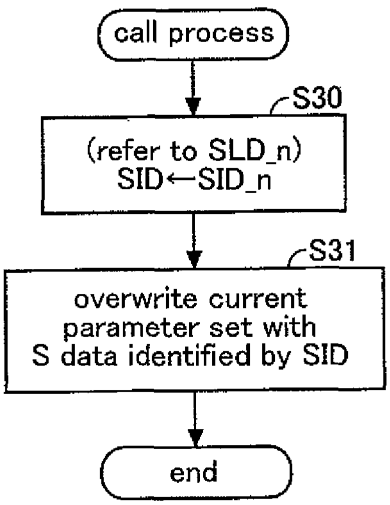
FIG. 10 is a flowchart of a snapshot call process executed on the digital mixer.

FIG. 10 indicates a flowchart of a call process executed when the user designates the nth SLID of an S list to demand to "call" the SLD.

When the user designates the nth SLD of the S list to demand "call", the call process is started. In step S30, the nth SLD_n of the S list designated for call is referred to, so that the SLD_n stored in the SLD_n is stored as identification information SID in a register. In step S31, an S data set identified by the identification information SID is read out, so that a parameter set of the current memory is overwritten with a parameter set of the read S data set. As a result, the parameter set of a snapshot corresponding to the called SLD_n is provided for the current memory, so that the digital mixer 1 is able to reproduce the snapshot stored in the nth SLID of the S list. After step S31, the call process terminates.

Figure 11:
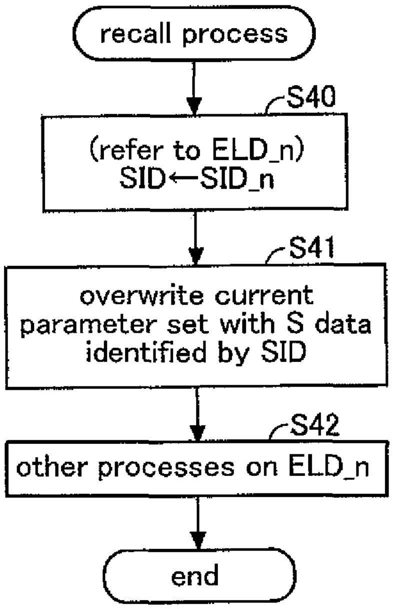
FIG. 11 is a flowchart of a snapshot recall process executed on the digital mixer.

FIG. 11 indicates a flowchart of a snapshot recall process executed when a trigger condition of TD_n stored in an ELD_n of the ELDs of an E list is satisfied.

When the satisfaction of the trigger condition TD_n of the ELD_n is detected, the recall process is started. In step S40, the ELD_n whose trigger condition has been met is referred to, so that the SID_n stored in the ELD_n is stored as identification information SID in a register. In step S41, an S data set identified by the identification information SID is read out to overwrite a parameter set stored in the current memory with a parameter set of the read S data set. In step S42, other processes are executed on the basis of OD_n stored in the ELD_n. As a result, a snapshot identified by the SID_n stored in the ELD_n whose trigger condition has been met is recalled, so that the digital mixer 1 reproduces the snapshot. After step S42, the recall process terminates. In a case where TD_n is time information, the trigger condition is to be satisfied when the time reaches TD_n. In a case where TD_n is manual, the trigger condition is to be satisfied when a trigger button is depressed.

Figure 12:
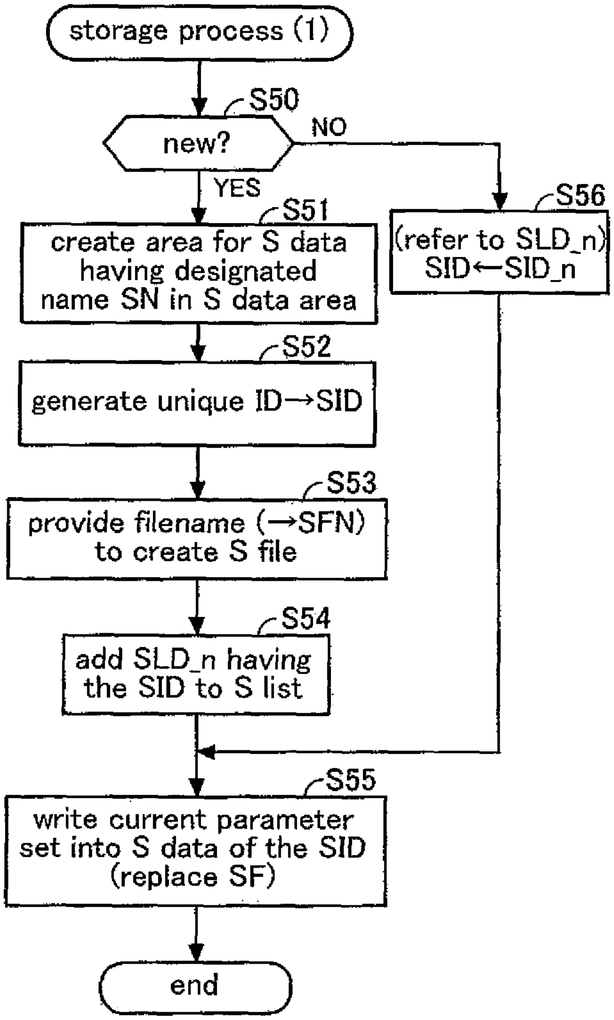
FIG. 12 is a flowchart of a storage process (1) executed on the digital mixer when the name of a snapshot is designated.

FIG. 12 indicates a flowchart of a storage process (1) executed when the user designates the nth SLD of an S list and the name of a snapshot (SN) to "store" the snapshot.

When the user designates the nth SLD of an S list and the name of a snapshot (SN) to demand "store", the storage process (1) is started to determine in step S50 whether the snapshot having the designated SN is a new one or not. If it is determined that the snapshot of the designated SN is a new one because the SN is not stored in the RAM 1-3, the process proceeds to step S51 to create an area for the designated SN in the S data area of the RAM 1-3. In step S52, a unique ID is generated to store the generated ID in a register as an SID. In step S53, a filename SFN which is not identical to any of the existing filenames is provided, so that a vacant S file (SF) for the provided SFN is created in the storage medium. In step S54, a new SLD_n having the SID stored in the register is added to the S list as the nth SLD. In step S55, a parameter set stored in the current memory is given the SID stored in the register to write the parameter set as the S data of the new snapshot into the S data area created in the RAM 1-3 in step S51 and the vacant SF created in the storage medium in step S53. The SN of the S data is the designated SN. When a parameter set edited in the current memory is to be stored as a new snapshot, as described above, a new SID for identifying the new snapshot is created, so that an SLD corresponding to the snapshot and having the SID is added to the S list. In addition, the parameter set stored in the current memory is given the created SID to be written into the S data area of the RAM 1-3 as an S data set of the new snapshot, with an SF of the S data set being written into the storage medium.

When it is determined in step S50 that there exists a snapshot having the designated snapshot name, the process proceeds to step S56 to refer to the nth SLD_n stored in the S list to store the SID_n of the SLD_n as an SID in the register. Then, the process proceeds to step S55 to overwrite a parameter set of S data stored in the RAM 1-3 identified by the SID of the register and to overwrite a parameter set of an SF which is identified by the SID stored in the register and is stored in the storage medium with the parameter set stored in the current memory. In a case where the snapshot which is to be stored is not new, as described above, the respective parameter sets of the S data stored in the RAM 1-3 having the designated snapshot name and the SF stored in the storage medium are replaced with the edited parameter set stored in the current memory. After step S55, the storage process (1) terminates.

Figure 13:
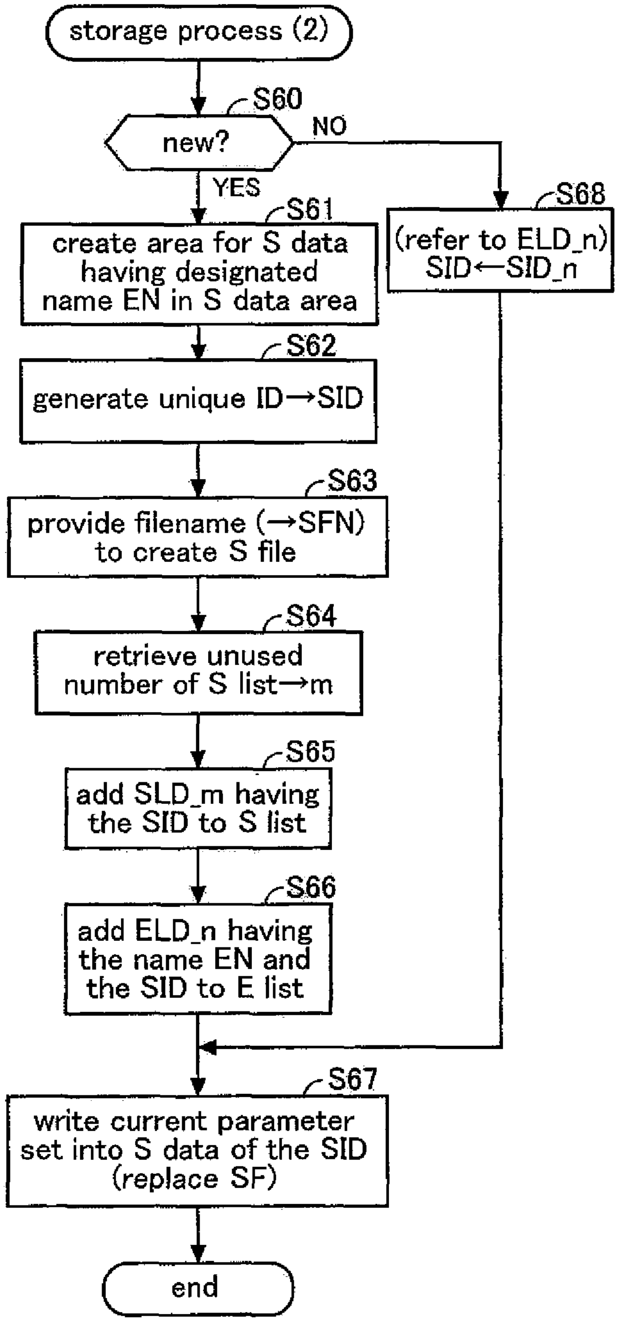
FIG. 13 is a flowchart of a storage process (2) executed on the digital mixer when the name of an event is designated.

FIG. 13 indicates a flowchart of a storage process (2) executed when the user designates the nth ELD of an E list and the name of an event (EN) to demand "store".

When the user designates the nth ELD of an E list and an event name (EN) to demand "store", the storage process (2) is started to determine in step S60 whether an event having the designated event name EN is a new one or not. If it is determined that the event name EN is a new one because the event having the designated EN is not stored in the E list, the process proceeds to step S61 to create an area for an S data set having a snapshot name (SN) which is the designated EN in the S data area of the RAM 1-3. In step S62, a unique ID is generated to store the generated ID in a register as an SID. In step S63, a filename SFN which is not identical to any of the existing filenames is provided, so that a vacant S file (SF) for the provided SFN is created in the storage medium. In step S64, an unused number of the S list is retrieved automatically or by user's selection to be stored as a number "m" in the register. In step S65, a new SLD_m of the number "m" having the SID stored in the register generated in step S62 is added to the S list as the mth SLD. In step S66, an ELD_n whose event name is the designated EN and which has the SID of the register is added to the nth ELD of the E list. In step S67, a parameter set stored in the current memory is given the SID stored in the register, so that the parameter set is written as the S data of the snapshot corresponding to the new event into the area created in the S data area of the RAM 1-3 in step S61 and the vacant SF created in the storage medium in step S63. The SN of the S data is the designated EN. Consequently, when a trigger condition of the ELD_n to which the snapshot identified by the created SID is added is satisfied, the snapshot is to be recalled. When the new event is to be stored, the S data of the snapshot which is to be recalled by the new event is written into the S data area of the RAM 1-3, with the S data being written into the storage medium as an SF.

If it is determined in step S60 that there exists an event having the designated event name, the process proceeds to step S68 to refer to the designated nth ELD_n of the E list to store the SID_n of the ELD_n as an SID in the register. Then, the process proceeds to step S67 to overwrite a parameter set of S data stored in the RAM 1-3 and identified by the SID of the register and to overwrite an SF stored in the storage medium and identified by the SID of the register with the parameter set stored in the current memory. In a case where the event which is to be stored is not new, as described above, the respective parameter sets of the S data which is stored in the RAM 1-3 and has the designated event name and the SF stored in the storage medium are replaced with the edited parameter set stored in the current memory. After step S68, the storage process (2) terminates.

Figure 14:
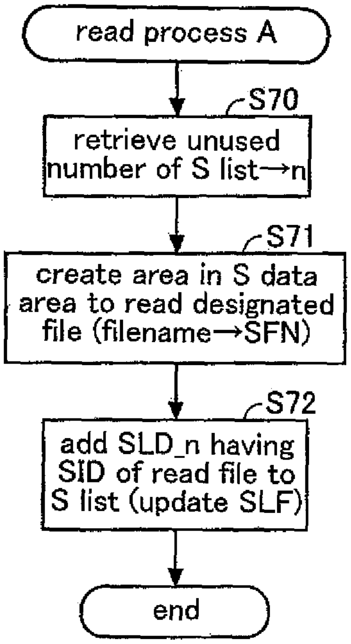
FIG. 14 is a flowchart of a snapshot read process A executed on the digital mixer.

FIG. 14 indicates a flowchart of a read process A executed when the user designates an SF of a plurality of S files (SFs) stored in the storage medium to demand "read".

When the user designates an SF to demand "read", the read process A is started. In step S70, an unused number of the S list stored in the S list area of the RAM 1-3 is retrieved automatically or by user's selection to be stored in a register as a number "n". In step S71, an area for an S data set is created in the S data area of the RAM 1-3, so that the S data set of the SF which has been demanded to "read" is read into the created area of the S data area. The SFN of the read S data is the SFN of the designated SF. In step S72, a new SLD_n having the SID included in the header of the read S data is added to the S list of the RAM 1-3 as the nth SLD, so that the S list is updated. After S72, the read process A terminates. As described above, the read process A is a process for additionally reading a snapshot by adding the S data of a designated snapshot to the S data area of the RAM 1-3. By the read process A, more specifically, the SLD having the SID which identifies the added snapshot is also added to the S list to update the S list.

Figure 15:
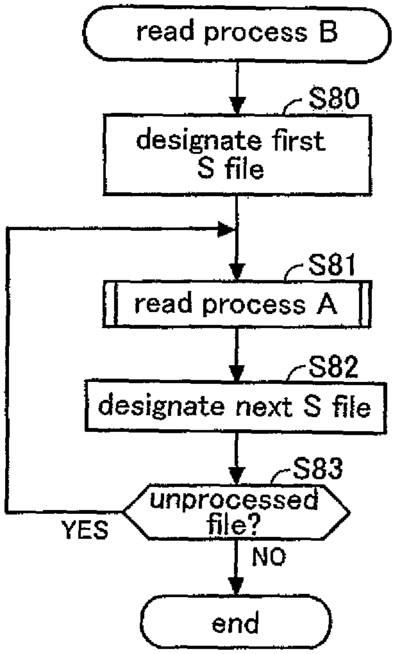
FIG. 15 a flowchart of a snapshot read process B executed on the digital mixer.

FIG. 15 indicates a flowchart of a read process B executed when the user designates a plurality of SFs stored in the storage medium to demand "read", with the order in which the SFs are read also being designated.

When the user designates a plurality of SFs and the order in which the SFs are read to demand "read", the read process B is started. In step S80, the first S file (SF) is designated on the basis of the designated order of reading. In step S81, the above-described read process A is executed to add the S data of the first SF to the S data area of the RAM 1-3 to read the S data, with the SLD having the SID which identifies the added S data being added to the S list. In step S82, the next S file (SF) is designated. In step S83, it is determined whether any of the designated SFs is unprocessed. If it is determined that there is such an unprocessed SF, the process returns to step S81 to add S data of the SF defined on the basis of the order designated in step S82 to the S data area of the RAM 1-3, with the SLD having the SID which identifies the added S data being added to the S list. Until it is determined in step S83 that there are no unprocessed SF, Steps S81 and S82 are repeated so that the S data of the designated SFs can be read into the S data area of the RAM 1-3 in the designated order of reading. When it is determined in step S83 that there is no unprocessed SF designated in step S82, the read process B terminates. By the read process B, as described above, the S data of a plurality of snapshots designated as SFs is added to the S data area of the RAM 1-3, with a plurality of SLDs having SIDs which identify the respective added snapshots being added to the S list to update the S list.

As described above, the read process B is a process for additionally reading a plurality of snapshots. More specifically, respective S data sets of the designated snapshots are added to the S data area of the RAM 1-3 one by one by repeatedly executing the read process A. During the read process B, the S list is updated by the addition of the SLDs having the SIDs which identify the added snapshots, respectively, to the S list.

Figure 16:
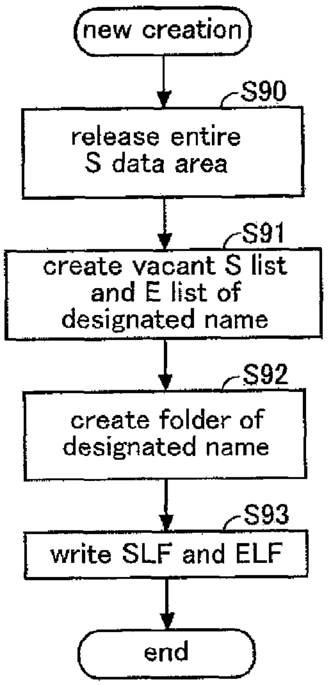
FIG. 16 is a flowchart of a snapshot list creation process executed on the digital mixer.

FIG. 16 indicates a flowchart of a new creation process executed when the user designates a name of an S list to demand "new creation".

When the user designates the SLN of an S list to demand "new creation", the new creation process is started. In step S90, the entire S data area is released, so that all the S data sets are cleared, with the S list and the E list being cleared. In step S91, vacant S list and E list having the designated name are created in the RAM 1-3. In step S92, a folder having the designated name is created in the storage medium, so that the vacant S list file (SLF) and the vacant E list file (ELF) created in step S91 are stored in the folder in step S93. After step S93, the new creation process terminates.

By the new creation process, as described above, all the data on snapshots stored in the RAM 1-3 is deleted, so that the S list and E list are also emptied. In the storage medium, furthermore, a folder is created to store the SLF of the vacant S list and the ELF of the vacant E list in the folder. Into the vacant S list and the vacant E list, separately created S list and E list may be read, respectively.

Figure 17:
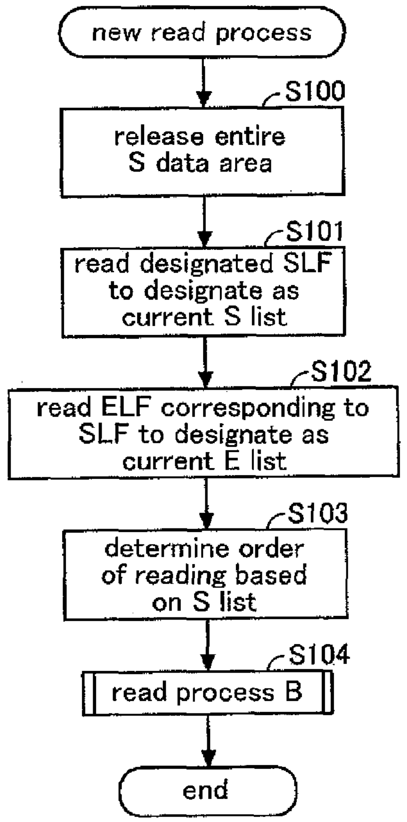
FIG. 17 is a flowchart of a snapshot list file new read process executed on the digital mixer.

FIG. 17 indicates a flowchart of a new read process executed when the user designates one of the SLFs stored in the storage medium to demand "newly read".

When the user designates an SLF stored in the storage medium to demand "newly read", the new read process is started. In step S100, the entire S data area of the RAM 1-3 is released, so that all the S data sets are cleared, with the S list and E list being cleared. In step S101, the S list of the designated SLF is read into the RAM 1-3 from the storage medium, so that the read S list is designated as a current S list. In step S102, the E list of the ELF corresponding to the designated SLF is read into the RAM 1-3 from the storage medium, so that the read E list is designated as a current E list. In step S103, the order in which all the S data sets stored in respective SLDs of the current S list designated in step S101 are read is determined. The order of the reading can be determined according to the date and time of creation of the S data, the SFN, SN or the like. In step S104, the read process B is carried out in the determined order of the reading, so that all the S data sets listed in the S list are sequentially read into the released S data area of the RAM 1-3. When all the S data sets have been read, step S104 finishes, so that the new read process terminates.

By the newly reading of the SLF, as described above, all the data stored in the S data area of the RAM 1-3 is deleted, so that all the S data corresponding to the newly read S list is read into the S data area.

Figure 18:
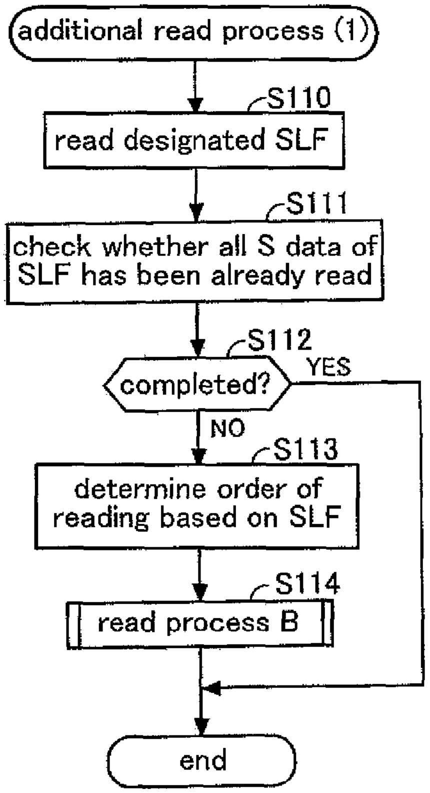
FIG. 18 is a flowchart of a snapshot list file additional read process executed on the digital mixer.

FIG. 18 indicates a flowchart of an additional read process (1) executed when the user designates an SLF stored in the storage medium to demand "additionally read".

When the user designates an SLF stored in the storage medium to demand "additionally read", the additional read process (1) is started. In step S110, the S list of the designated SLF is read into the RAM 1-3. In step S111, it is checked whether all the S data sets identified by the SIDs stored in the SLDs of the read S list have been read into the S data area of the RAM 1-3. In step S112, it is determined whether the check of step S111 results in that the reading of the S data sets has been completed or not. If it is determined that the reading has been completed, the additional read process (1) immediately terminates. If it is determined in step S112 that the reading has not been completed, the process proceeds to step S113 to determine, on the basis of the designated SLF, the order in which the S data sets which have not been read yet is read. The order of the reading can be determined according to the date and time of creation of the S data, the SFN, SN or the like. In step S114, the read process B is carried out in the determined order of the reading, so that the S data sets which have not been read yet are sequentially read from their SFs of the storage medium into the S data area of the RAM 1-3, with SLDs having the SIDs identifying the respective read S data being added to the S list. When all the S data sets have been read, step S114 finishes, so that the additional read process (1) terminates.

As described above, when the S list is additionally read, the S data sets of the snapshots listed in the additionally read S list are also additionally read automatically.

Figure 19:
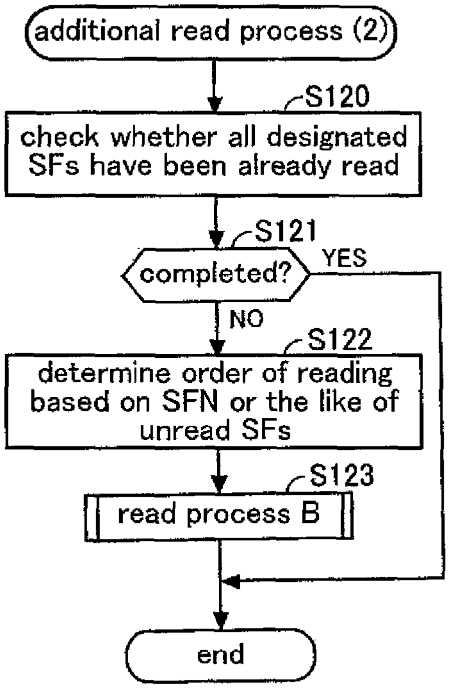
FIG. 19 is a flowchart of a snapshot file additional read process executed on the digital mixer.

FIG. 19 indicates a flowchart of an additional read process (2) executed when the user designates a plurality of SFs stored in the storage medium as files or a folder/folders to demand "additionally read".

When the user designates a plurality of SFs stored in the storage medium to demand "additionally read", the additional read process (2) is started. In step 120, it is checked whether all the S data sets of the designated SFs have been already read into the S data area of the RAM 1-3. In step S121, it is determined whether the check of step S120 results in that the reading of the S data has been completed or not. If it is determined that the reading has been completed, the additional read process (2) immediately terminates. If it is determined in step S121 that the reading has not been completed, the process proceeds to step S122 to determine, according to the date and time of creation of the S data, the SFN, SN or the like, the order in which the S data sets of the designated SFs which have not been read yet are read. In step S123, the read process B is carried out in the determined order of the reading, so that the S data sets which have not been read yet are sequentially read into the S data area of the RAM 1-3, with SLDs having the SIDs identifying the respective read S data sets being added to the S list. When all the S data sets which had not been read have been read, step S123 finishes, so that the additional read process (2) terminates.

As described above, when a plurality of snapshots are to be additionally read, SLDs having SIDs identifying S data sets of the additionally read snapshots are additionally read into the S list automatically.

Figure 20:
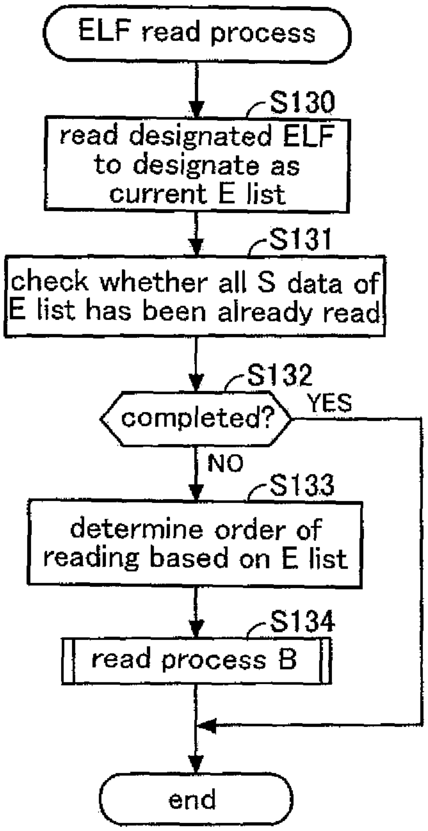
FIG. 20 is a flowchart of an event list file read process executed on the digital mixer.

FIG. 20 indicates a flowchart of an ELF read process executed when the user designates an ELF stored in the storage medium to demand "read".

When the user designates an ELF stored in the storage medium to demand "read", the ELF read process is started. In step S130, the E list of the designated ELF is read into the RAM 1-3, so that the read E list is designated as a current E list. In a case where the RAM 1-3 has already had an E list, the existing E list is cleared. In step S131, it is checked whether all the S data sets identified by the SIDs stored in the ELDs of the read E list have been already read or not. In step S132, it is determined whether the check of step S131 results in that the reading of the S data has been completed or not. If it is determined that the reading has been completed, the ELF read process immediately terminates. If it is determined in step S132 that the reading has not been completed, the process proceeds to step S133 to determine, on the basis of the read E list, the order in which the S data sets which have not been read yet are read. The order of the reading can be determined according to the date and time of creation of the S data, the SFN, SN or the like. In step S134, the read process B is carried out in the determined order of the reading, so that the S data sets which have not been read yet are sequentially read from corresponding SFs of the storage medium into the S data area of the RAM 1-3, with SLDs having the SIDs identifying the respective read S data sets being added to the S list. When all the S data sets which had not been read have been read, step S134 finishes, so that the ELF read process terminates.

When an E list is to be newly read, as described above, in a case where snapshots indicated by the events listed in the newly read E list have not been read yet, the S data sets of the unread snapshots are also read.

Figure 21A:
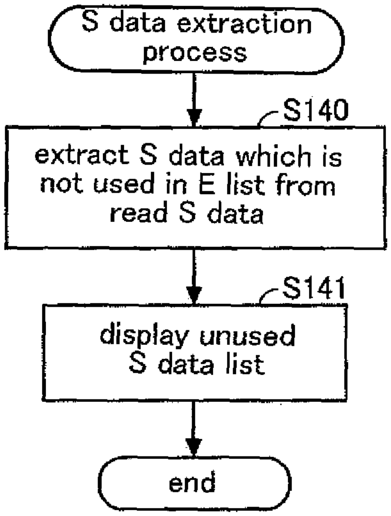
FIG. 21A is a flowchart of an unused snapshot data extraction process executed on the digital mixer.

FIG. 21A indicates a flowchart of an S data extraction process executed when the user designates "extraction of unused S data".

When the user designates "extraction of unused S data", the unused S data extraction process is started. In step S140, from among S data sets read into the S data area of the RAM 1-3, S data sets which are not used in the E list are extracted. In step S141, a list of unused S data sets is displayed. The unused S data list is a list of S data sets of snapshots which are not designated by any of the events listed in the E list. After step S141, the S data extraction process terminates.

Figure 21B:
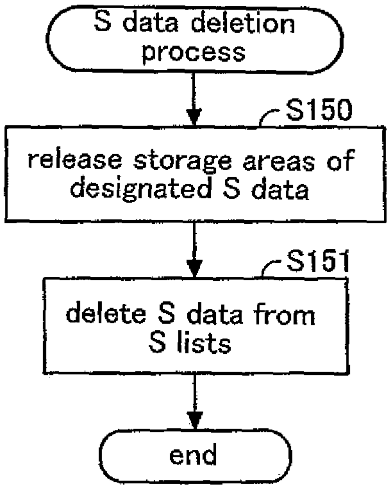
FIG. 21B is a flowchart of an unused snapshot data deletion process executed on the digital mixer.

FIG. 21B indicates a flowchart of an S data deletion process executed when the user designates an S data set on the unused S data list to demand "delete".

When the user designates an S data set on the unused S data list to demand "delete", the S data deletion process is started. In step S150, the storage area of the RAM 1-3 provided for the designated S data set and the storage area of the storage medium provided for the SF of the designated S data set are released. In step S151, the designated S data set is deleted from the S lists stored in the RAM 1-3 and the storage medium, respectively. More specifically, the SLD having the SID of the designated S data set is deleted. After step S151, the S data deletion process terminates.

By periodically executing the S data extraction process and the S data deletion process, unnecessary data can be deleted efficiently from the RAM 1-3 and the storage medium.

According to the above-described present invention, in a case where the workload of creating a plurality snapshots is shared by some people, the separately created snapshots can be brought together by additionally reading an S list by the additional read process (1) or by additionally reading snapshots by the additional read process (2). When the separately created snapshots are brought together, the respective S data sets of all the snapshots listed in the S list are read into the RAM. In other words, the S list is updated so that the S list can store all the snapshots created separately by the some people, with all the S data sets of the snapshots being read into the S data area of the RAM. Even in a case where the E list requires recalling of a large number of snapshots, therefore, the workload of creating the snapshots can be shared by some people.

According to the present invention, furthermore, S data of an existing snapshot can be partially combined with S data of a snapshot which is to be added to create a new snapshot. In addition, the present invention enables creation of an E list by using both existing snapshots and added snapshots. In this case, the E list stores SIDs each indicative of a snapshot in a manner in which the SIDs are correlated with event numbers. Because each SID provided for each snapshot is a unique ID, there is no possibility of a wrong snapshot being designated. In a case where an S data set indicated by an SID of an event listed in the E list has not been read into the S data area of the RAM, furthermore, a message indicative of absence of the S data set in the S data area is displayed. In such a case, even if the event is to be reproduced, any snapshots will not be recalled.

The present invention is applied not only to the digital mixer but also to various audio apparatuses having a DSP for processing audio signals such as effectors and digital amplifiers.

What is claimed is:

1. An audio apparatus comprising:

a parameter control;

at least one memory device having a current memory area, a setting data memory area, and a list memory area;

a microprocessor programmed to execute:

a current memory storing task that stores, in the current memory area, a parameter set comprising a plurality of parameters;

a parameter changing task that changes a value of a parameter, among the plurality of parameters of the parameter set stored in the current memory area, in accordance with a user manipulation of the parameter control;

a setting data storing task that stores, in the setting data memory area, a plurality of setting data sets, each having a unique ID;

a list memory storing task that stores, in the list memory area, the plurality of IDs identifying the plurality of setting data sets stored in the setting data memory area in association with data numbers contained in the setting data sets, respectively;

a storing task that responds to a user request for storing with a specified data number, wherein the storing task creates, in a case where an ID associated with the specified data number is not stored in the list memory area, a unique ID and stores the parameter set stored in the current memory area in the setting data memory area as a setting data set identified by the created unique ID, as well as storing the created unique ID in the list memory area in association with the setting data set and identified by the ID with the parameter set stored in the current memory area; and a call task that responds to a user call request with a data number being specified, wherein the call task reads, in a case where an ID associated with the specified data number is stored in the list memory area, a setting data set identified by the ID from the setting data memory area and overwrites the parameter set stored in the current memory area with the read setting data set; and an audio signal processor connected to the microprocessor and that processes an input audio signal in accordance with the parameter set stored in the storage device and outputting the processed audio signal.

2. The An audio apparatus according to claim 1, wherein the microprocessor is further programmed to execute a write task that writes into a storage medium, in response to a request for writing of a list, a list file storing the plurality of IDs stored in the list memory area and a plurality of setting data files each storing a setting data set stored in the setting data memory area and identified by the ID given to the setting data set.

3. The An audio apparatus according to claim 1, further comprising:

a storage medium that stores a list file containing a plurality of IDs and a plurality of setting data files each storing a setting data set identified by the ID given to the setting data set; and wherein the microprocessor is further programmed to execute a read task that reads, in response to a request for additional reading of a list, the plurality of IDs stored in the list file from the storage medium to read out, in a case where the list memory area does not have an ID included in the read IDs, the setting data set identified by the ID that is not included in the list memory area from the storage medium to store the read setting data set in the setting data memory area, as well as storing the ID in the list memory area in association with an unused data number.

4. The audio apparatus according to claim 3, wherein the microprocessor is further programmed to execute a deletion task that deletes, in response to a request for a new reading of a list, the IDs stored in the list memory area and the plurality of setting data sets stored in the setting data memory area, and also reading from the storage medium the plurality of IDs stored in the list file to read out setting data sets identified by the IDs from the storage medium to store the read setting data sets in the setting data memory area, as well as storing the IDs in the list memory area in association with unused data numbers, respectively.

5. The audio apparatus according to claim 1, wherein the storing task overwrites, in a case where an ID associated with the specified data number is stored in the list memory area, the setting data set stored in the setting data memory area and identified by the ID with the parameter set stored in the current memory area.

* * * * *